Jan. 25, 1927. 1,615,479
F. M. POOLE
OIL DISTILLATION APPARATUS
Filed July 6, 1925
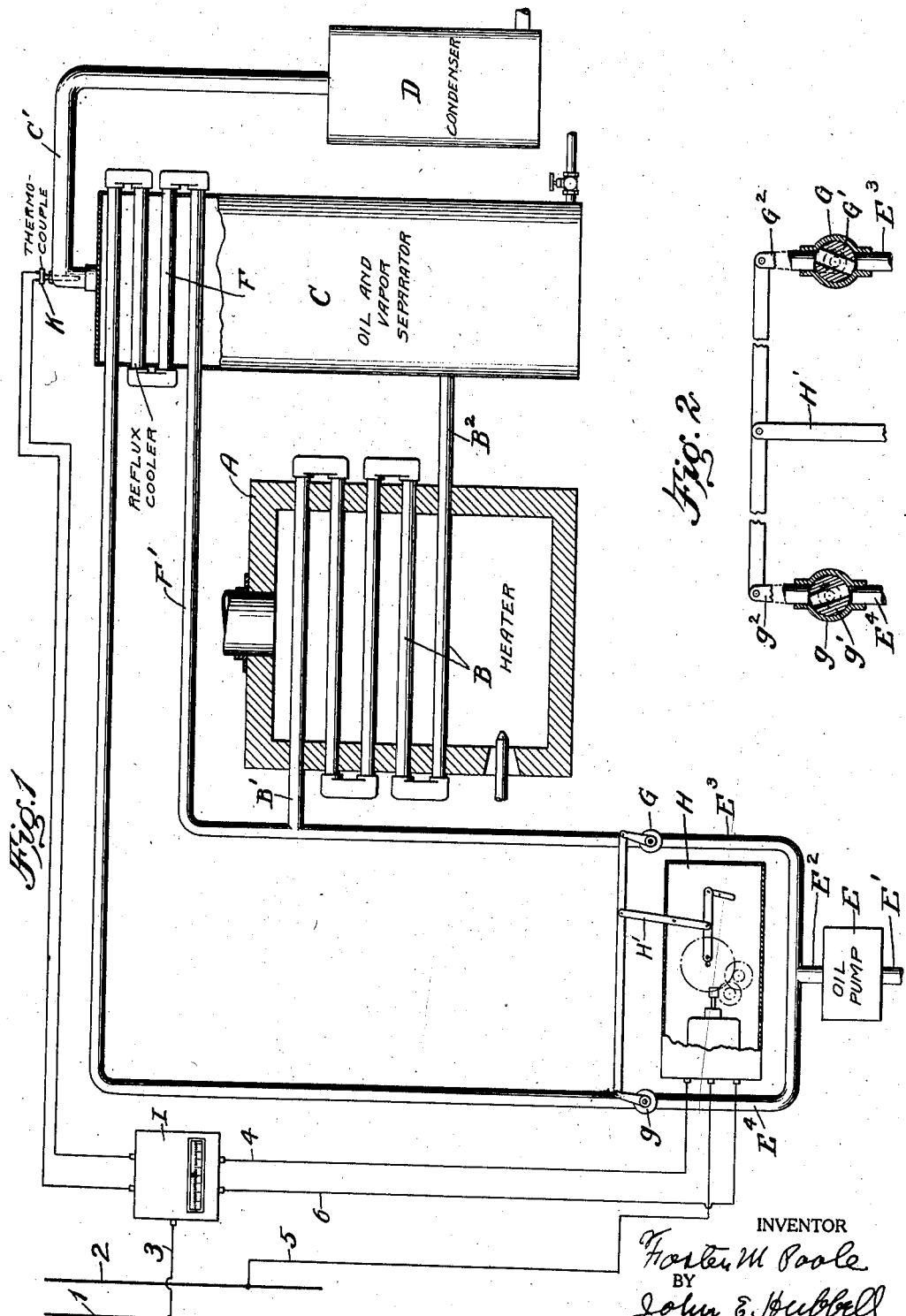

Patented Jan. 25, 1927.

1,615,479

UNITED STATES PATENT OFFICE.

FOSTER MALIC POOLE, OF TULSA, OKLAHOMA, ASSIGNOR TO THE BROWN INSTRUMENT COMPANY, OF PHILADELPHIA, PENNSYLVANIA, A CORPORATION OF PENNSYLVANIA.

OIL-DISTILLATION APPARATUS.

Application filed July 6, 1925. Serial No. 41,901.

My present invention relates to the type of apparatus for distilling petroleum and analogous oil in which the oil after being heated in a tube still is discharged into an oil and vapor separating tower which is provided with a vapor outlet to a condenser and with reflux provisions for transferring heat to the oil passing to the heater from the vapors leaving the tower whereby the vapors are cooled and their temperatures and composition are stabilized.

The general object of the present invention is to provide apparatus of the character described with simple and effective provisions for regulating the heat absorption by the separating tower reflux provisions as required for the maintenance of a desirably stable temperature in the vapor outlet from the tower, and without interfering with the supply of oil continuously and at the proper rate to the oil heater. In the preferred practical mode of carrying out my invention, provisions are made for passing through the reflux cooler a fractional portion only of the oil supplied to the heater, and for automatically increasing and decreasing the amount of oil supplied to the heater through the reflux cooler as required to keep the temperature of the vapors leaving the tower approximately constant, while at the same time avoiding any corresponding decrease or increase in the total amount of oil passing to the heater.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a diagrammatic representation of an oil distilling plant; and

Fig. 2 is an elevation partly in section illustrating controlling valves employed in Fig. 1.

In the drawings I have diagrammatically illustrated in a somewhat conventional manner, one type of petroleum distillation apparatus embodying a preferred form of the present invention. The apparatus shown comprises a tube still or oil heater A in which oil is heated as it passes through the heater tubes B from an inlet B' to an outlet $B^2$. The heated oil and vapor mixture passes from the heater outlet $B^2$ to the oil and vapor separating tower C which may be of any usual and suitable type, and as shown, is provided at its upper end with an internal reflux vapor cooler in the form of a pipe coil F externally traversed by the oil vapors as they pass to the vapor outlet C' which is connected to the usual condenser D. Oil under suitable pressure is supplied to the inlet B' of the oil heater by a circulating or feed pump E, the inlet E' of which draws stock from any suitable source, and the outlet $E^2$ of which has two branches $E^3$ and $E^4$. The branch $E^3$ is connected directly to the heater inlet B', while the branch $E^4$ is connected to the inlet of the reflux cooler coil F. The outlet F' from the latter is connected to the heater oil inlet B'.

Associated with the apparatus already described are provisions for automatically varying the relative amounts of oil supplied to the heater oil inlet B' directly through the pump outlet branch $E^3$, and through the branch $E^4$, reflux coil F, and outlet pipe F', in automatic response to temperature changes of the vapors leaving the tower C through the outlet C'. These provisions as shown comprise a throttle valve G in the pipe $E^3$, a similar throttle valve $g$ in the pipe $E^4$ and a relay motor operated valve actuator H. The latter is operated to increase the flow through the pipe branch $E^3$ and diminish that through the pipe branch $E^4$ as the temperature in the vapor outlet diminishes below a predetermined normal value, and to diminish the flow through the branch $E^3$ and increase that through the branch $E^4$ when said temperature increases above said normal value. To thus control the valve actuator H, I employ a thermocouple K, or analogous device, which is responsive to the temperature in the vapor outlet C', and which has its terminals connected to the galvanometer of a suitable control instrument I.

As shown, the valve G comprises a rotatable valve member G' and an operating arm $G^2$ by which the valve member G' may be partially rotated to throttle the oil flow through the valve more or less. The valve $g$ may be, and as shown is identical in construction with the valve G, comprising parts $g'$ and $g^2$ exactly like the parts G' and G². The arms G² and $g^2$ are link-connected to the swinging actuating arm H' of the valve actuator H, the connections between the two valve members G² and $g^2$, and the arm H' being such that when the upper end of the arm H' is moved to the right as shown in the drawings, the valve member G' is adjusted in the closing direction, and the valve member $g'$ is adjusted in the opening direction. Conversely, when the upper end of the arm H' is moved to the left, the flow through the valve G is increased and that through the valve $g$ is diminished.

The construction of the valve actuator H need not be herein illustrated and described in detail as its particular construction forms no part of the present invention. On the contrary, the actuator may be of known type, and in particular it may be of the type shown in the Egar and Wilhjelm Patent No. 1,397,680, granted November 22, 1921. The control instrument I, of itself, embodies nothing novel with me but may be of the known type shown, for example, by the patent to Brown, No. 1,355,448 granted October 12, 1920, in which deflections of a galvanometer pointer in one direction as a result of a rise above normal in the temperature to which the thermocouple K is exposed, will close one control circuit, while the deflection of the galvanometer pointer in the opposite direction as a result of a reduction in a temperature to which the thermocouple K is exposed, will close a second control circuit.

The control circuit closed by the instrument I, when the temperature of the thermocouple K rises above normal may include supply conductors 1 and 2, conductors 3, 4, and 5, and the motor winding of the valve actuator H which, when energized, causes the upper end of the member H' to be moved to the right. This increases the amount of oil passing through the reflux cooling coil F, and thereby tends to reduce the vapor temperature to normal. Conversely, when the temperature of the thermocouple K falls below normal, the instrument I closes a control circuit including the supply conductors 1 and 2, conductors 3, 5, and 6, and the motor circuit of the valve actuator H which when energized causes the upper end of the actuating arm H' to be moved to the left, and thereby diminishes the amount of oil passing through reflux cooler coil F, and so tends to increase the temperature in the vapor outlet C'. With the parts suitably proportioned, the flow through the valve G will increase and decrease as the flow through the valve $g$ decreases and increases so that the adjustment of the valves by the actuator H will not necessarily vary the total amount of oil passing to the heater inlet B'.

It will be apparent to those skilled in the art that if the rate of oil delivery by the pump E does not vary appreciably with small changes in the pump outlet pressures and the coil F and the pipes E⁴ and F' offer sufficient frictional resistance to oil flow therethrough, the regulation of the relative amounts of oil passing to the heater through the branches E³ and E⁴ described above could be obtained with the valve $g$ omitted. The conjoint use of the valves G and $g$, as described, makes the control of the flow distribution somewhat more positive, however, than is attainable with the valve G alone, unless the frictional resistance to flow through the coil F and pipes E⁴ and F' is undesirably large. Moreover, the use of the two valves instead of a single valve in the pipe E³ possesses the advantage of permitting the desired regulation with a minimum increase in, and variation of, back pressure on the circulating pump E.

The apparatus disclosed provides for the desired regulation of the reflux cooler action in automatic response to the vapor outlet temperature, without interfering with the continuous supply of oil at the proper rate to the oil heater by the feed pump E. A special advantage of practical importance obtained with the particular form of control mechanism illustrated, is that it permits of the effective utilization of a control instrument I, and of a motor operated valve actuator H which are of commercial type and highly suitable for the purpose.

It will be understood, of course, that the relation of each valve member G' and $g'$ to the actuator arm H' can be adjusted in a known manner when necessary or desirable as by adjusting the arms G² or $g^2$ angularly with respect to the valve part G' or $g'$, respectively.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:

1. Oil distilling apparatus comprising an oil heater having an oil inlet and an oil outlet, an oil and vapor separator having an inlet to which said outlet is connected and having a vapor outlet, a reflux cooler for the vapors issuing through said vapor outlet, means adapted to supply oil at an approximately constant rate to said inlet oil heater comprising means for passing a portion of the oil supplied directly through said reflux cooler to said heater inlet, means independent of the cooler for passing the remaining portion of the oil to be heated to said heater inlet, and means automatically responsive to the vapor outlet temperature for varying the amounts of oil passing through the reflux cooler as required to maintain an approximately constant temperature in said vapor outlet.

2. Oil distilling apparatus comprising an oil heater having an oil inlet and an oil outlet, an oil and vapor separator having an inlet to which said outlet is connected and having a vapor outlet, a reflux vapor cooler for the vapors issuing through said vapor outlet, means adapted to supply oil at an approximately constant rate to said inlet oil heater comprising means for passing a portion of the oil supplied through said reflux cooler to said heater inlet, means independent of the cooler for passing the remaining portion of the oil supplied directly to said heater inlet, and means automatically responsive to the vapor outlet temperature for varying the amount of oil passing through the reflux cooler as required to maintain an approximately constant temperature in said vapor outlet, said means comprising a thermocouple in the vapor outlet, a control meter connected to said thermocouple, and a relay motor controlled by said meter.

3. Oil distilling apparatus comprising an oil heater having an oil inlet and an oil outlet, an oil and vapor separator having an inlet to which said outlet is connected and having a vapor outlet, a reflux cooler for the vapors issuing through said vapor outlet, means for passing a portion of the oil to be heated through said reflux cooler to said heater inlet, means independent of the cooler for passing the remaining portion of the oil to be heated to said heater inlet, and means automatically responsive to the vapor outlet temperature for varying the ratio of said portions of oil as required to maintain an approximately constant temperature in said vapor outlet, said means comprising a separate regulating valve for each portion, a thermocouple in the vapor outlet, a control meter connected to said thermocouple, and a relay operated actuator for said valve controlled by said meter.

4. Oil distilling apparatus comprising an oil heater having an oil inlet and an oil outlet, an oil and vapor separator having an inlet connected to said outlet and having a vapor outlet, an oil pump, a direct connection from the outlet of said pump to said heater inlet, a second connection between said pump outlet and said heater inlet, said second connection including a reflux cooler for the vapors passing out of the separator through said vapor outlet, and thermostatic means responsive to the temperature of the vapors leaving the separator for varying the relative amounts of oil passing to said oil inlet through said two connections as required to maintain an approximately constant vapor outlet temperature.

5. Oil distilling apparatus comprising an oil heater having an oil inlet and an oil outlet, an oil and vapor separator having an inlet connected to said outlet and having a vapor outlet, an oil pump, a direct connection from the outlet of said pump to said heater inlet, a second connection between said pump outlet and said heater inlet, said second connection including a reflux cooler for the vapors passing out of the separator through said vapor outlet, and thermostatic means responsive to the temperature of the vapors leaving the separator for varying the relative amounts of oil passing to said oil inlet through said two connections as required to maintain an approximately constant vapor outlet temperature, said means comprising a throttling valve in each of said connections, and means for simultaneously adjusting said valves to decrease the oil flow through said direct connection, and to increase the oil flow through said second connection on an increase in said vapor temperature, and on a decrease in said vapor temperature to decrease the oil flow through said second connection and to increase the oil flow through said direct connection.

Signed at Tulsa, in the county of Tulsa, and State of Oklahoma, this 29th day of June, A. D. 1925.

FOSTER MALIC POOLE.